Patented Dec. 3, 1940

2,223,367

UNITED STATES PATENT OFFICE 2,223,367

INSECTICIDE

Howard D. Hively, Charleston, W. Va.

No Drawing. Application May 1, 1939,
Serial No. 271,203

7 Claims. (Cl. 167—24)

This invention relates to insecticides preferably of a type that may be used by spraying it so that it comes in contact with the subject to be destroyed, or it may be sprinkled as, for instance, where it is applied to insects or bugs on plants or the like, but if it is sprinkled, the stream should preferably be fine so as to conserve the material.

An object of this invention is to produce an insecticide having the efficiency of any known commercial insecticide and yet it can be inexpensively produced, since the initial cost of the basic ingredients is very low.

The insecticide has been used with success in the destruction of house flies, horn flies, stable flies, potato bugs and many other injurious insects where the insecticide can be brought into contact with such insects.

From the foregoing, it may be said that an object of the invention is to produce an efficient and satisfactory insecticide which will not deteriorate under temperatures within the range of those experienced in a climate similar to that existing in the United States and which will not freeze within the limits of such temperatures and furthermore, will be comparatively inexpensive to produce.

With the foregoing and other objects in view, the invention consists in the method of producing the insecticide and the resultant product.

In carrying the invention into practice, a plant known as habak which, according to the best information obtained by the inventor, is a native of Persia, but it is also grown in the United States and, so far as known, it has no other name in the United States of America and so, for the purpose of this disclosure, it will be hereafter referred to by its Arabic name. In addition to habak which is comminuted or finely divided by grinding or the like, solvents miscible with petroleum oils such as kerosene, varsol, deobase, naphtha or solvents such as alcohols, esters and ethers may be commingled with the habak. It has been found in practice that while the leaves and flowers of the plant have the greatest active properties for the purpose, the whole plant may be employed except that the fibrous tissues should be removed by screening.

The product obtained from the treatment of the plant is commingled with a solvent substantially in the proportions of 1 pound to 5 pounds of said product to 20 gallons of the solvent and the best results so far attained have been where the proportions have been 5 pounds of the product to 20 gallons of the solvent. These proportions may also be varied, under certain conditions, for all the plants of the species are not uniform and are subject to some variation on account of the conditions of the soil and the conditions of moisture supplied while the plant is developing, and hence, it is to be understood that the proportions may be varied to suit the particular conditions and requirements.

The commingled habak and the solvent is then macerated for a suitable period and it has been found that if subjected to heat for approximately 72 hours the best results obtain when the above indicated proportions are employed. The commingled habak and solvent, under certain conditions, may be subjected to a temperature of from 200° F. to 300° F., but care must be taken to prevent undue evaporation so that known apparatus for accomplishing this result may be employed.

With known methods of reclaiming the liquid after maceration, which has included the employment of a centrifuge or a press, the reclaimed fluid is about 88 per cent of the original solvent introduced in the combination.

The fluid recovered at this stage of the process is highly colored and will stain objects on which it is sprayed, so that the next step of the process is to remove the coloring element by filtration or other well known methods, and the resultant fluid has a light tint of green.

The solvents employed should be preferably of the odorless type such as are well known to the manufacturers of insecticides.

The recovered and filtered or otherwise treated fluid is in condition for use as an insecticide when applied as heretofore stated, but it has been found to derive a higher degree of lethal activity by the addition of "Lethane" which, according to its chemistry is beta-butoxy-beta-prime-thiocyano-diethyl-ether.

It has been found that 1 per cent of "Lethane" added to the resultant product as above recovered will produce an insecticide of inexpensive character and having the qualities heretofore stated.

I claim:

1. An insecticide comprising a decoction of habak and a solvent.
2. An insecticide comprising a decoction of habak and a solvent with "Lethane."
3. An insecticide comprising a solvent impregnated with habak and provided with a portion of "Lethane."
4. An insecticide comprising a solvent impregnated with habak and provided with a portion of "Lethane," the proportions being 99 per cent of the solvent and habak and 1 per cent of "Lethane."

5. The herein described process of producing an insecticide consisting in comminuting habak, removing the fibre therefrom, adding a solvent to the comminuted habak and macerating the same until the habak is thoroughly saturated, extracting the impregnated fluid, decoloring the said fluid, and commingling "Lethane" with said fluid.

6. The herein described process of producing an insecticide consisting in comminuting habak, removing the fibre therefrom, adding a solvent to the comminuted habak and macerating the same until the habak is thoroughly saturated, extracting the impregnated fluid, decoloring the said fluid, and commingling "Lethane" with said fluid in the proportions of 99 percent of the fluid and 1 per cent of the "Lethane."

7. The herein described process of producing an insecticide consisting in comminuting habak, removing the fibre therefrom, adding a solvent to the comminuted habak and macerating the same at a temperature range of 200° F. to 300° F. until the habak is thoroughly saturated, extracting the impregnated fluid, decoloring the said fluid, and commingling "Lethane" with said fluid.

HOWARD D. HIVELY.